(12) United States Patent
Tokumo et al.

(10) Patent No.: US 7,665,565 B2
(45) Date of Patent: Feb. 23, 2010

(54) SUPPORT STRUCTURE FOR CONTROL PEDAL OF VEHICLE

(75) Inventors: Masayuki Tokumo, Fuchu-cho (JP); Tetsuo Hiura, Kaita-cho (JP); Hirofumi Ishida, Kaita-cho (JP)

(73) Assignees: Auto Technica Corporation (JP); Mazda Motor Corporation (JP)

( * ) Notice: Subject to any disclaimer, the term of this patent is extended or adjusted under 35 U.S.C. 154(b) by 398 days.

(21) Appl. No.: 11/822,167

(22) Filed: Jul. 3, 2007

(65) Prior Publication Data
US 2008/0006119 A1  Jan. 10, 2008

(30) Foreign Application Priority Data
Jul. 7, 2006   (JP) ............................. 2006-188199
Sep. 22, 2006  (JP) ............................. 2006-256860

(51) Int. Cl.
*B60R 21/01* (2006.01)
*G05G 1/14* (2006.01)

(52) U.S. Cl. ..................... 180/274; 280/748; 180/271; 74/512

(58) Field of Classification Search ................ 180/271, 180/274; 280/748; 74/512
See application file for complete search history.

(56) References Cited

U.S. PATENT DOCUMENTS

| 6,101,894 | A  | * | 8/2000 | Tiemann et al. | 74/512 |
| 7,415,909 | B2 | * | 8/2008 | Miyoshi et al. | 74/560 |
| 7,497,144 | B2 | * | 3/2009 | Yoon | 74/512 |

2001/0027889 A1 * 10/2001 Thistleton .................... 180/271
(Continued)

FOREIGN PATENT DOCUMENTS

| EP | 0 659 615 A1 | 6/1995 |
| JP | 09-216528 | 8/1997 |
| JP | 2005-510785 | 4/2005 |
| WO | WO 03/045750 A1 | 6/2003 |

OTHER PUBLICATIONS

European Search Report, EP07111630, Jun. 5, 2008.

*Primary Examiner*—Ruth Ilan
(74) *Attorney, Agent, or Firm*—Studebaker & Brackett PC; Donald R. Studebaker

(57) ABSTRACT

Disclosed is a support structure for a vehicle control pedal, which comprises a pedal bracket (3) supporting the control pedal (4) through a first support shaft (S1) inserted through a support hole (303), a swingable lever (7) adapted to, during a vehicle collision, come into interference with a vehicle body member (6) so as to be swingingly moved about a second support shaft (S2) while pushing the first support shaft (S1) downwardly to allow the first support shaft (S1) to drop out of the support hole (303), and a drop-out restriction member (8) engaged by a pin member (20) and coupled to the swingable lever (7) in a relatively unswingable manner, so as to restrict the drop-out of the first support shaft (S1). The support structure is designed such that, according to the swing movement of the swingable lever (7) during the vehicle collision, the restriction on drop-out of the first support shaft (S1) by the drop-out restriction member (8) is removed to allow the first support shaft (S1) to drop out of the support hole (303). The support structure of the present invention can prevent impact energy during a vehicle collision from being input to a leg of a driver through the control pedal while reliably restricting accidental drop-out of the control pedal in a normal condition.

9 Claims, 7 Drawing Sheets

U.S. PATENT DOCUMENTS

2006/0162481 A1* 7/2006 Sato ............................ 74/512
2007/0137398 A1* 6/2007 Tokumo et al. ............... 74/512
2007/0266815 A1* 11/2007 Johansson .................... 74/512

* cited by examiner

US 7,665,565 B2

SUPPORT STRUCTURE FOR CONTROL PEDAL OF VEHICLE

BACKGROUND OF THE INVENTION

1. Field of the Invention

The present invention relates to a support structure for a control pedal of a vehicle.

2. Description of the Related Art

Generally, a vehicle control pedal, such as a brake pedal or a clutch pedal, adapted to be swingingly operated by a foot of a driver, is supported relative to a dash panel by a pedal bracket. Specifically, the bracket is fixed to the dash panel, and an upper end of the control pedal is pivotally supported by the petal bracket through a support shaft extending in a width, i.e., lateral, direction of a vehicle body, so that the control pedal is swingably supported relative to the dash panel. In such a vehicle control pedal, it is desired to employ a mechanism for preventing impact energy during a vehicle collision (frontal collision) from being input to a leg of a driver through the control pedal.

As techniques for coping with the demand, JP 2005-510785A (Patent Publication 1) discloses a control pedal support structure comprising a pedal bracket which swingably supports a vehicle control pedal through a first support shaft extending in a lateral direction of a vehicle body to serve as a swing supporting point of the control pedal, and a swingable lever which is swingably supported by the pedal bracket through a second support shaft extending in the lateral direction and adapted to come into contact with a member of the vehicle body (hereinafter referred to as "vehicle body member") during a frontal collision so as to be swingingly moved about the second support shaft, whereby the first support shaft is forcibly displaced in a rearward direction of the vehicle body according the swing movement of the swingable lever.

JP 3269372B (Patent Publication 2) discloses another control pedal support structure designed to, during a frontal collision, displace a pivot shaft serving as a swing supporting point of a vehicle control pedal, rearwardly relative to a pedal depressing portion (i.e., pedal pad) formed at a lower end of the control pedal, wherein a biasing force of a spring is used for keeping the pivot shaft at its initial position in an upper end of the control pedal.

EP 0659615A1 (Patent Publication 3) discloses yet another control pedal support structure designed to, during a frontal collision, expandingly deform a pedal bracket holding a support shaft of a vehicle control pedal, in a lateral direction of a vehicle body, so as to allow the control pedal to drop out of the pedal bracket.

In the support structures disclosed in Patent Publications 1 and 2, in a normal (non-collision) condition, the support shaft of the control pedal can be supported by the pedal bracket with a certain level of strength. However, if a large load is applied to the control pedal downwardly, for example, due to an excessive pedal depressing operation by a driver, the support shaft of the control pedal is likely to drop out of the pedal bracket. In the support structure disclosed in Patent Publication 3, the control pedal is likely to be inclined due to a load obliquely applied thereto in a course of the expanding deformation of the pedal bracket during a vehicle collision, and thereby cause difficulty in allowing the control pedal to reliably drop out of the pedal bracket.

SUMMARY OF THE INVENTION

In view of the above circumstances, it is an object of the present invention to provide a support structure for a vehicle control pedal, capable of preventing impact energy during a vehicle collision from being input to a leg of a driver through the control pedal while reliably restricting accidental drop-out of the control pedal in a normal condition.

This technical object is achieved by a vehicle control pedal support structure of the present invention having the following features. A support structure for a vehicle control pedal adapted to be swingingly operated by a driver, which comprises: a pedal bracket fixed to a dash panel, and formed with a support hole which has a first support shaft inserted therethrough to extend in a lateral direction of a vehicle body so as to serve as a swing supporting point of the control pedal, and an elongate hole which extends in a longitudinal direction of the vehicle body and has a pin member inserted therethrough to extend in the lateral direction; a swingable lever pivotally supported by the pedal bracket through a second support shaft extending in the lateral direction, and adapted to, during a vehicle collision, come into interference with a vehicle body member so as to be swingingly moved about the second support shaft while pushing the first support shaft downwardly to allow the first support shaft to drop out of the support hole; and a drop-out restriction member engaged by the pin member and coupled to the swingable lever in a relatively unswingable manner, so as to restrict the drop-out of the first support shaft. The support structure is designed such that, according to the swing movement of the swingable lever during the vehicle collision, the restriction on drop-out of the first support shaft by the drop-out restriction member is removed to allow the first support shaft to drop out of the support hole.

DESCRIPTION OF THE PREFERRED EMBODIMENTS

With reference to the accompanying drawings, a preferred embodiment of the present invention will now be described.

Figure 1:
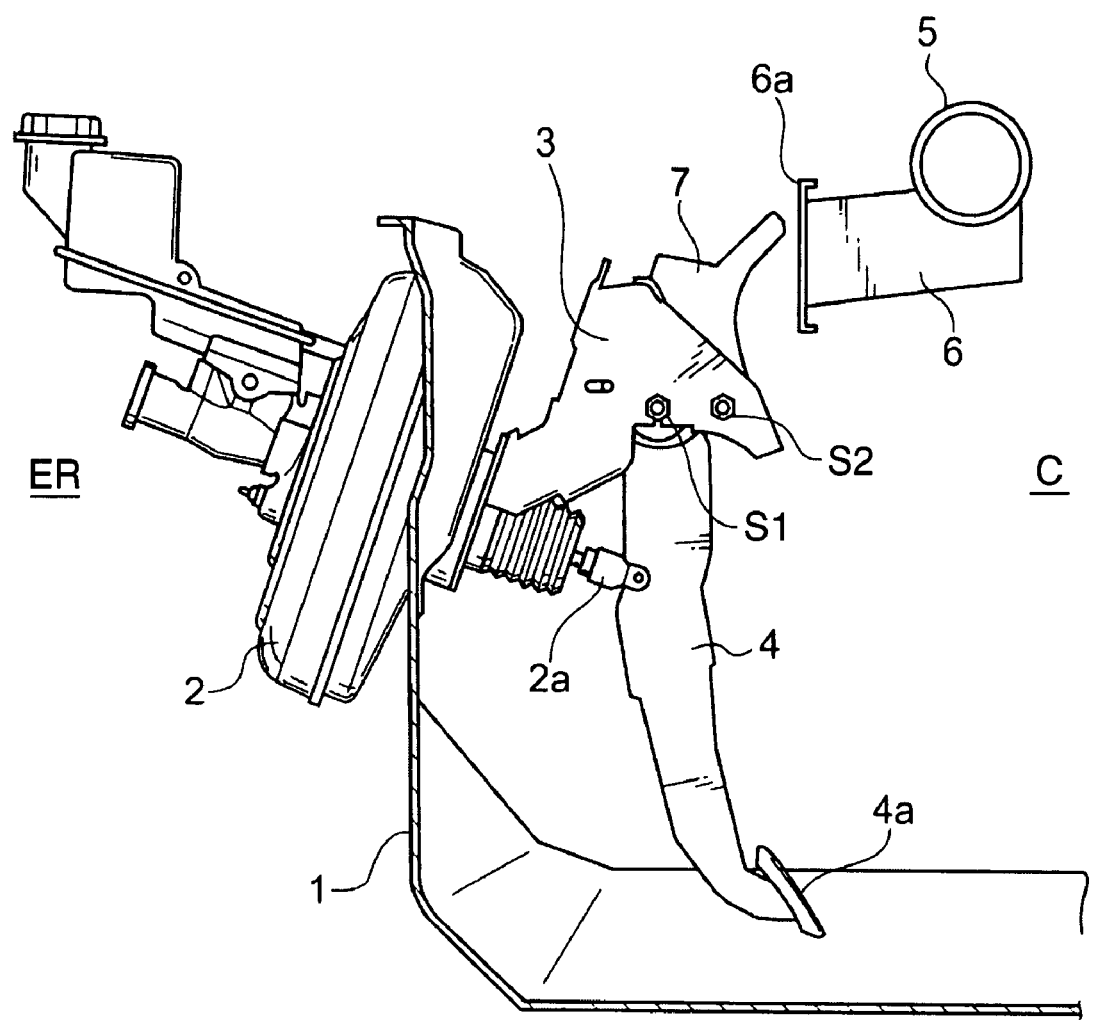
FIG. 1 is a schematic side view showing a vehicle control pedal support structure according to one embodiment of the present invention, in a state after being assembled to a vehicle.

FIG. 1 is a schematic side view showing a support structure for a vehicle control pedal, according to one embodiment of the present invention. In FIG. 1, the reference numeral 1 indicates a dash panel. The dash panel 1 is disposed to define an engine compartment ER on a front side thereof, and a passenger compartment C on a rear side thereof. The dash panel 1 has one surface which faces the engine compartment ER and fixedly mounts a brake booster 2 thereto, and the other surface which faces the passenger compartment C and fixedly mounts a pedal bracket 3 thereto. The pedal bracket 3 supports a brake pedal 4 swingably in a frontward/rearward direction (i.e., longitudinal direction) of a vehicle body. In a conventional manner, the brake booster 2 is connected to the brake pedal 4 through a push rod 2a. Specifically, when a pedal depressing portion (i.e., pedal pad or foot pad) 4a formed at a lower end of the brake pedal 4 is depressed frontwardly by a foot of a driver (not shown), the brake pedal 4 is swingingly moved frontwardly about a first support shaft (S1) located at an upper end of the brake pedal 4 to pushingly move the push rod 2a frontwardly, and a braking force is given to the vehicle according to the frontward movement of the push rod 2a.

In FIG. 1, the reference numeral 5 indicates an instrument panel reinforcement formed of a pipe member which extends in a width direction (i.e., lateral direction) of the vehicle body and supports a steering column and other components. The instrument panel reinforcement 5 is provided with a vehicle body member 6 fixed to a lower region of an outer peripheral surface thereof to extend in the frontward direction of the vehicle body. The vehicle body member 6 has a plate-shaped vertical wall 6a provided at a front end thereof to extend in an approximately vertical direction.

FIGS. 2 to 5 specifically show the support structure for supporting the brake pedal 4. As shown in FIGS. 2 to 5, a swingable lever 7 and a drop-out restriction member 8 are attached to the pedal bracket 3. These three members are designed to support the first support shaft S1 for the brake pedal 4 with high stiffness and achieve a mechanism for allowing the first support shaft S1 to drop from the pedal bracket 3 downwardly during a vehicle collision (as described in detail later).

The pedal bracket 3 has an anchor base plate 301 to be fixed to the dash panel 1 with a bolt, and a pair of right and left side plates 302, 302 extending generally parallel to each other from an upper end of the anchor base plate 301 in the rearward direction of the vehicle body. Each of the right and left side plates 302, 302 is formed with a first support hole 303 having an approximately circular shape. The right and left first support holes 303, 303 are formed to allow the first support shaft S1 to be inserted therethrough in such a manner as to extend in the lateral direction.

Figure 3:
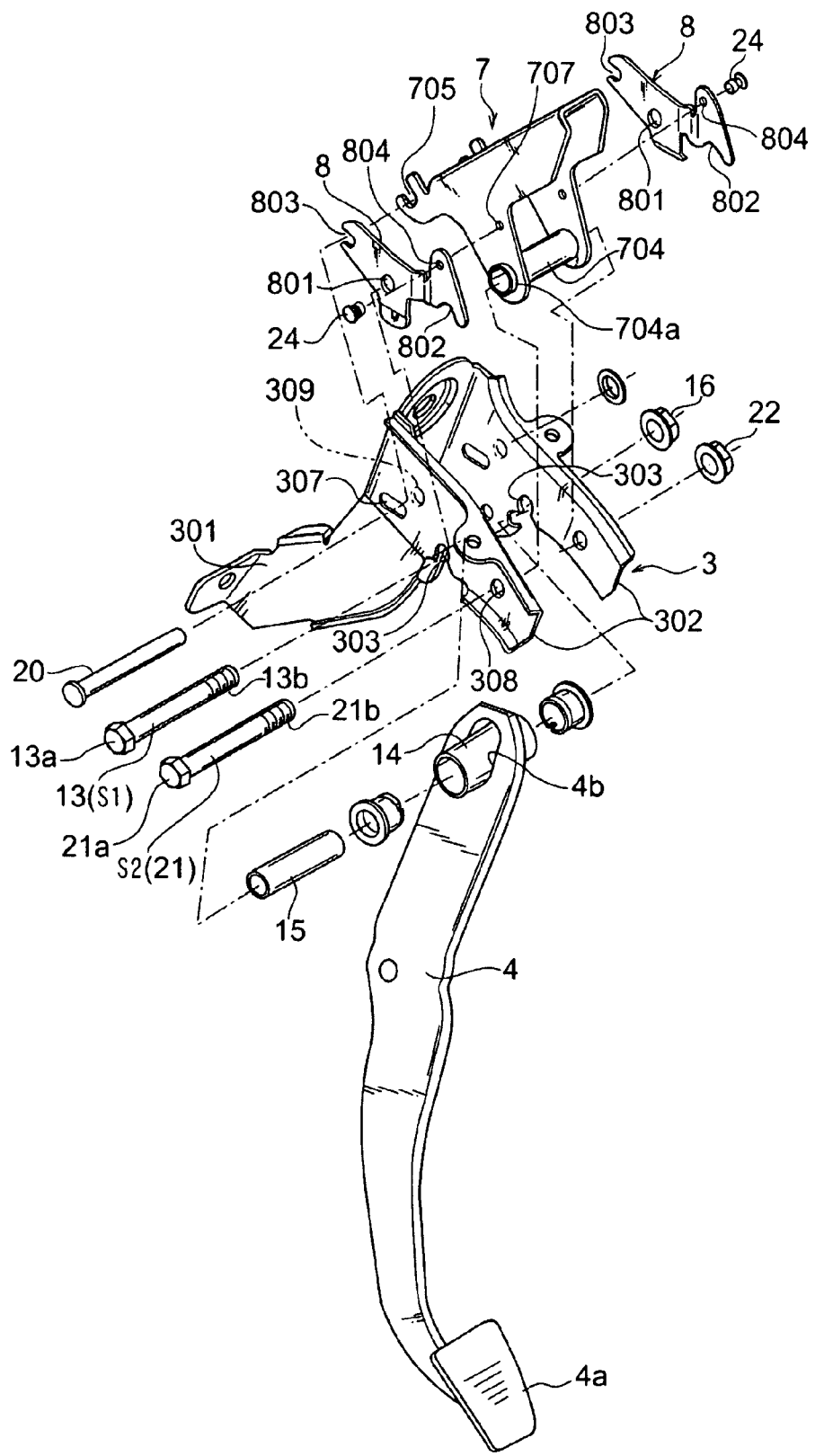
FIG. 3 is an exploded perspective view specifically showing the support structure.

As shown in FIG. 3, the first support shaft S1 is made up of a shank of a bolt 13. The shank of the bolt 13 has a threaded portion 13b which is formed at a distal end thereof, i.e., an end thereof on an opposite side of a bolt head 13a, and adapted to be threadingly engaged with a nut 16.

The upper end of the brake pedal 4 is formed with an insertion hole 4b which insertingly receives a double sleeve consisting of outer and inner sleeves 14, 15. The brake pedal 4 is swingably supported by the pedal bracket 3 through the above bolt 13 which is inserted through the inner sleeve 15 of the double sleeve. Specifically, after the bolt 13 is inserted through the right and left first support holes 303, 303 of the pedal bracket 3 and the inner sleeve 15 to expose the threaded portion 13b of the bolt 13 outside the pedal bracket 3, the nut 16 is screwed onto the threaded portion 13b to fix the bolt 13 to the pedal bracket 3. In this manner, the brake pedal 4 is supported by the pedal bracket 3 swingably about the first support shaft S1 made up of the shank of the bolt 13.

Figure 6:
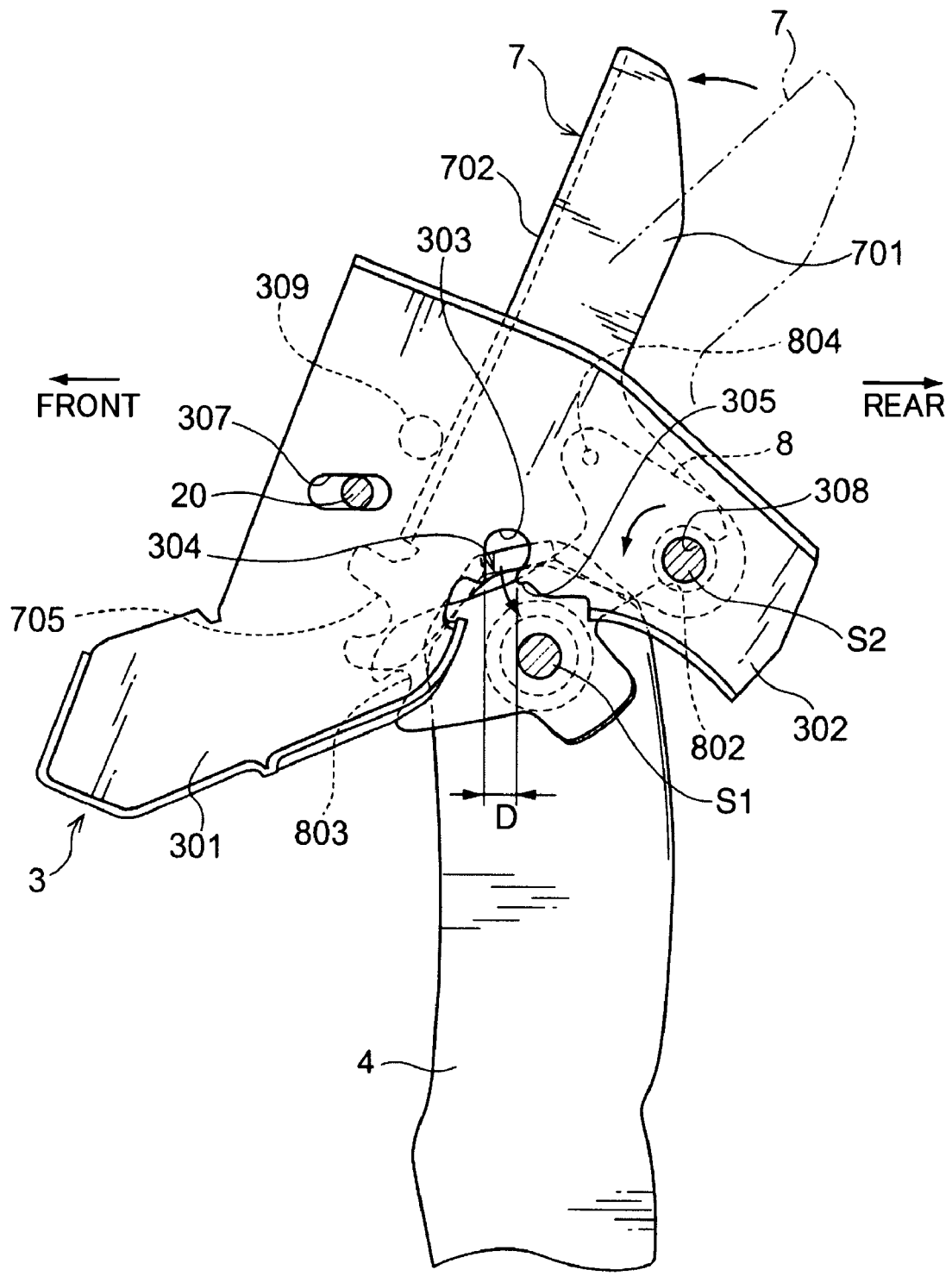
FIG. 6 is a side view for explaining an operation of the support structure during a vehicle collision.

FIG. 6 shows the support structure in a state after the brake pedal 4 drops out during a vehicle collision. As best seen in FIG. 6, the first support hole 303 is opened downwardly through a cutout 304 formed in a lower peripheral edge thereof, and one of longitudinally opposed edges of the cutout 304 is formed with a protrusion 305. Due to the presence of the protrusion 305, a distance between the opposed edges of the cutout 304 becomes less than a diameter of the first support hole 303 to prevent the first support shaft S1 inserted through the first support hole 303 from dropping down through the cutout 304. That is, the protrusion 305 functions as a drop-out restriction portion which restricts the first support shaft S1 from accidentally dropping out of the first support hole 303 in a normal (i.e., non-collision) condition. More specifically, the protrusion 305 is designed to be plastically deformed in response to a predetermined value or more of load input thereto when the first support shaft S1 is pushed downwardly by the swingable lever 7 during a vehicle collision, so as to expand the cutout 304 to allow the first support shaft S1 to drop down therethrough. In the illustrated embodiment, the protrusion 305 is formed in only one (rear edge) of the opposed edges of the cutout 304. Alternatively, the protrusion 305 may be formed in both the opposed edges of the cutout 304.

Each of the pair of side plates 302, 302 of the pedal bracket 3 has a front portion which is located on a frontward side relative to the first support hole 303 and formed with an elongate hole 307 extending in the longitudinal direction of the vehicle body, and a rear portion which is located on a rearward side relative to the first support hole 303 and formed with a second support hole 308 having a circular shape. In FIGS. 2, 3, 6 and 7, the broken line indicated by the reference numeral 309 represents a tooling hole.

Figure 4:
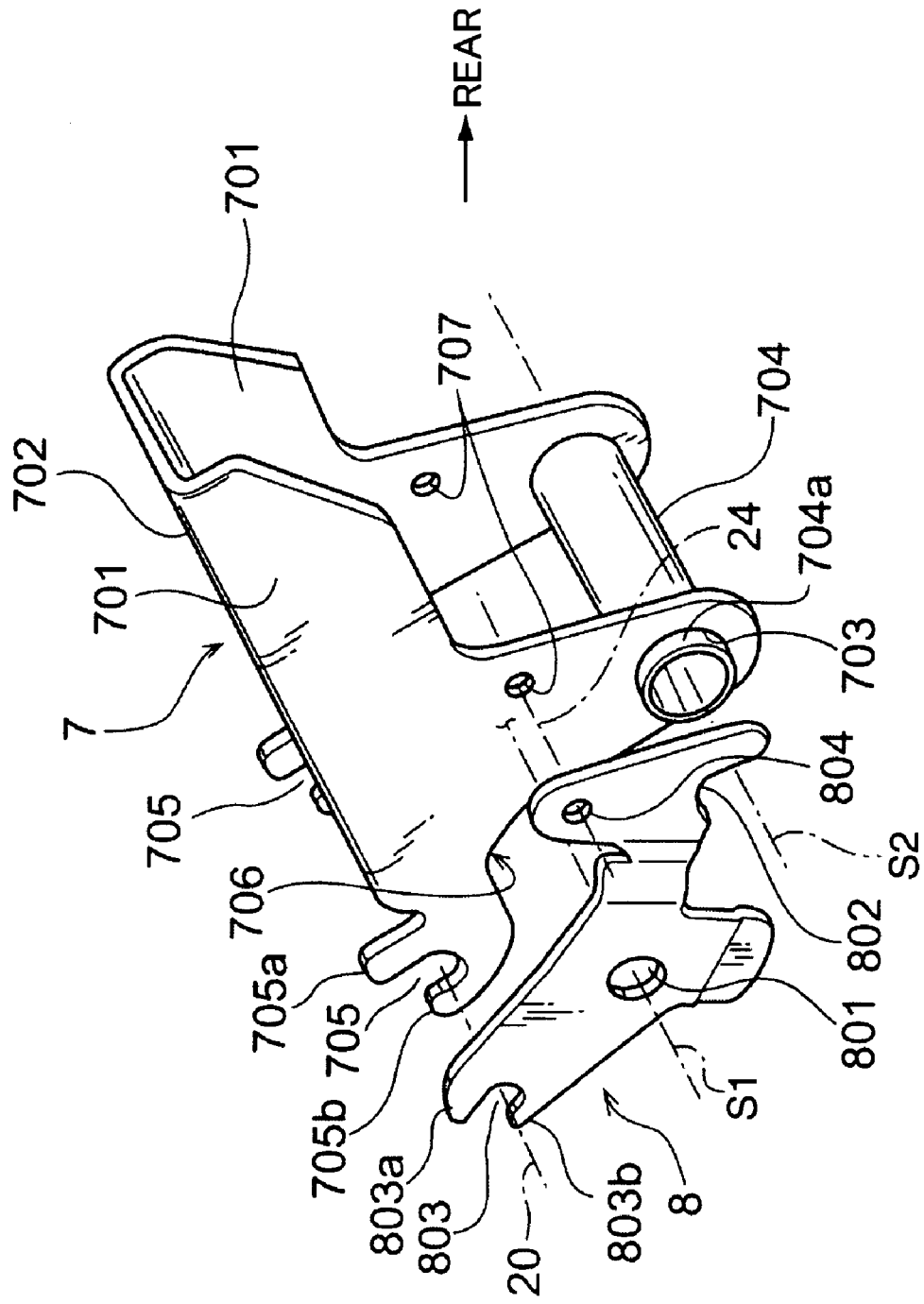
FIG. 4 is an exploded perspective view showing a swingable lever and a drop-out restriction member in the support structure.
Figure 5:
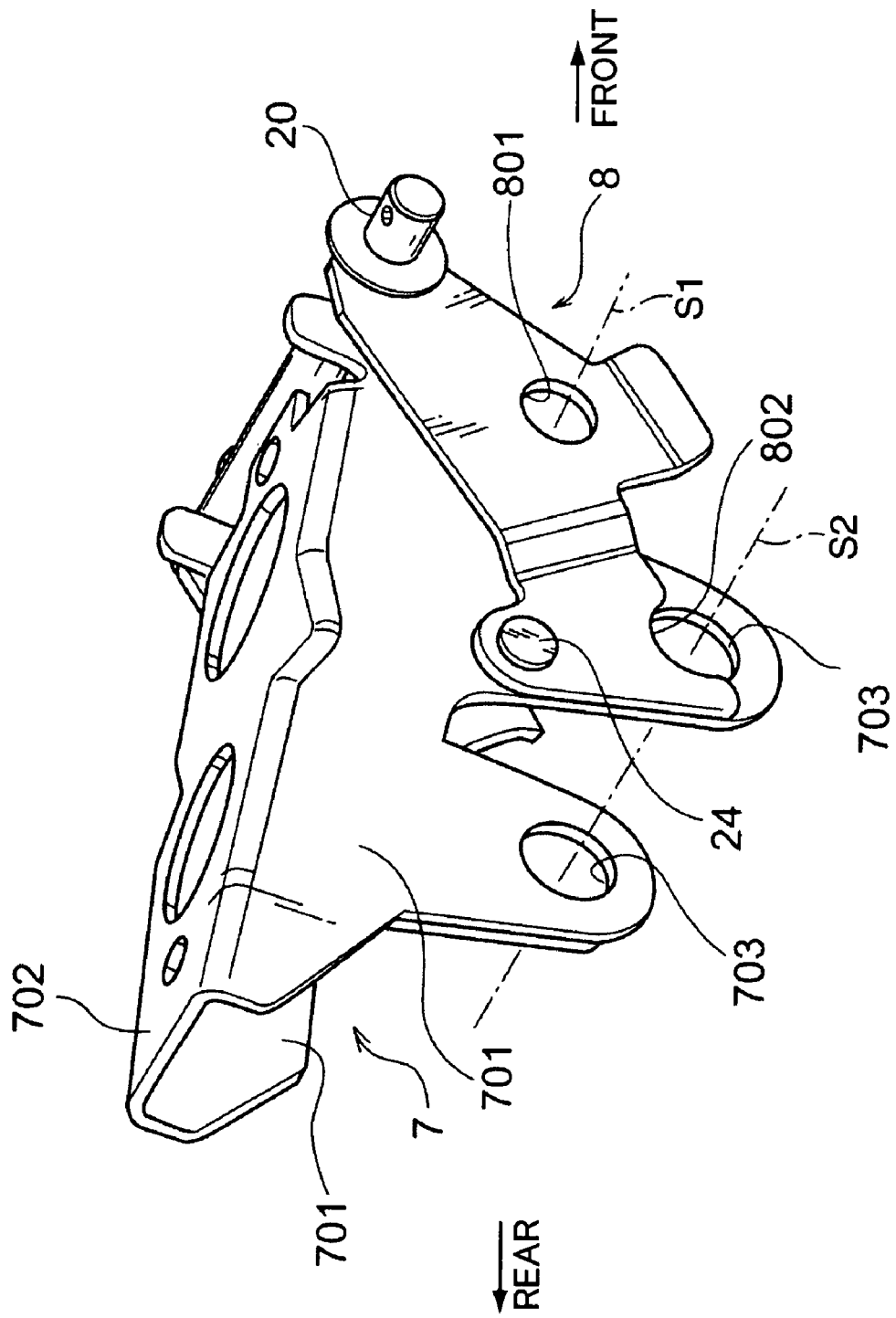
FIG. 5 is a perspective view showing the swingable lever and the drop-out restriction member in a state after being assembled together.

As shown in FIG. 4, the swingable lever 7 is formed as a member having an approximately angular-C shape in rear view which comprises a pair of right and left side plates 701, 701 each extending along an inner surface of a corresponding one of the right and left side plates 302, 302 of the pedal bracket 3, and a top plate 702 connecting between respective upper edges of the side plates 701, 701. Each of the side plates 701, 701 and the top plate 702 are formed to largely extend rearwardly.

In the swingable lever 7, each of the right and left side plates 701, 701 has a lower end formed with an insertion hole 703 which fittingly mounts a cylindrical-shaped spacer 704 therein. The cylindrical-shaped spacer 704 is formed to have an axial length dimension greater than a distance between the side plates 701, 701, and arranged such that each of opposite ends of the cylindrical-shaped spacer 704 protrudes outside a corresponding one of the side plates 701, 701 to form a protruding end 704a. The protruding end 704a of the cylindrical-shaped spacer 704 is engaged with a rear end of the drop-out restriction member 8, as described in detail later.

The side plate 701 of the swingable lever 7 has a front end formed as a pair of upper and lower pawls 705a, 705b protruding frontwardly to define therebetween a U-shaped cutout 705 having an opening oriented in the frontward direction of the vehicle body. Further, the side plate 701 has a front lower edge formed as an arc-shaped portion 706 having a generally circular arc shape. The swingable lever 7 is arranged such that the arc-shaped portion 706 is disposed above the first support shaft S1 serving as a swing supporting point of the brake pedal 4.

The above swingable lever 7 is attached to the pedal bracket 3 through the second support shaft S2 extending in the lateral direction. As shown in FIG. 3, the second support shaft S2 is made up of a shank of a bolt 21. The shank of the bolt 21 has a threaded portion 21b which is formed at a distal end thereof, i.e., an end thereof on an opposite side of a bolt head 21a, and adapted to be threadingly engaged with a nut 22. After the bolt 21 is inserted through the cylindrical-shaped spacer 704 fittingly mounted in the insertion hole 703 of the swingable lever 7, and the second support holes 308, 308 formed in the rear portion of the pedal bracket 3 to expose the threaded portion 21b of the bolt 21 outside the pedal bracket 3, the nut 22 is screwed onto the threaded portion 21*b* to fix the bolt 21 to the pedal bracket 3. In this manner, the swingable lever 7 is supported by the pedal bracket 3 swingably about the second support shaft S2 made up of the shank of the bolt 21. The swingable lever 7 after being attached to the pedal bracket 3 through the second support shaft S2 is supported in such a manner that the arc-shaped portion 706 is disposed on a frontward side relative to a position of the second support shaft S2, and above the first support shaft S1 serving as a swing supporting point of the brake pedal 4.

The elongate holes 307, 307 formed in the pedal bracket 3 have a pin member 20 inserted therethrough to extend in the lateral direction. The pin member 20 is slidably supported along a longitudinal direction of each of the elongate holes 307, 307 (i.e., the longitudinal direction of the vehicle body), and disposed at a rear end of the elongate hole 307 in the normal (non-collision) condition. Further, the U-shaped cutouts 705, 705 at the front end of the swingable lever 7 are designed to be fitted with the pin member 20 disposed at the rear end of the elongate hole 307 so as to allow the front end of the swingable lever 7 to be engaged by the pin member 20. The swingable lever 7 is formed and disposed such that, in the state after the front end of the swingable lever 7 is engaged by the pin member 20, the arc-shaped portions 706, 706 are positioned with a predetermined clearance C (see FIG. 2) relative to an outer peripheral surface of the outer sleeve 14 through which the first support shaft S1 for the brake pedal 4 is inserted.

In this embodiment, the drop-out restriction member 8 is comprised of a pair of mutually independent members. Each of the drop-out restriction members 8, 8 is supported by the pedal bracket 3 at a position between an inner surface of a corresponding one of the side plates 302, 302 of the pedal bracket 3, and an outer surface of a corresponding one of the side plates 701, 701 of the swingable lever 7.

Each of the drop-out restriction members 8, 8 is disposed to extend in the longitudinal direction and along the corresponding side plate 302. As seen in FIG. 4, the drop-out restriction member 8 has a longitudinally central portion formed with a circular-shaped insertion hole 801, a rear end formed with semicircular-shaped recess 802 having a downwardly oriented opening, and a front end formed with a pair of upper and lower pawls 803*a*, 803*b* protruding frontwardly to define therebetween a U-shaped cutout 803 having an opening oriented in the frontward direction of the vehicle body.

The above drop-out restriction members 8, 8 are assembled to the pedal bracket 3 by inserting the first support shaft S1 through the insertion holes 801, 801 formed in the respective longitudinally central portions thereof. Each of the drop-out restriction members 8, 8 is formed and disposed such that, in the assembled state, the recess 802 formed in the rear end thereof is placed on a corresponding one of the protruding ends 704*a*, 704*a* of the cylindrical-shaped spacer 704 fittingly mounted in the lower ends of the swingable lever 7 (see FIG. 2). More specifically, the recess 802 has an inner peripheral surface with a circular arc shape conforming to an outer shape of the protruding end 704*a* of the cylindrical-shaped spacer 704. Thus, when the recess 802 is placed on an upper half of the protruding end 704*a*, the rear end of the drop-out restriction member 8 is engaged by the swingable lever 7 through the protruding end 704*a*.

Each of the drop-out restriction members 8, 8 assembled to the pedal bracket 3 in the above manner is further engaged by the pin member 20 supported between the right and left elongate holes 307, 307 of the pedal bracket 3. Specifically, the U-shaped cutout 803 formed at the front end of the drop-out restriction member 8 is designed to be fitted with the pin member 20 supported by the pedal bracket 3, so as to allow the drop-out restriction member 8 to be supported by the pedal bracket 3 through the front end thereof engaged by the pin member 20. In the above manner, the front end of the drop-out restriction member 8 is engaged by the pin member 20, and the opposite rear end of the drop-out restriction member 8 is engaged by the swingable lever 7 through the cylindrical-shaped spacer 704. This makes it possible to stably keep each of the drop-out restriction members 8, 8 at a predetermined position illustrated in FIGS. 2 and 5, and reliably restrict the first support shaft S1 inserted through the insertion holes 801, 801 of the drop-out restriction members 8, 8 from accidentally dropping out in the normal condition.

In the above support structure, the swingable lever 7 and the pair of the drop-out restriction members 8, 8 are formed, respectively, with the pair of U-shaped cutouts 705, 705 and the pair of U-shaped cutouts 803, 803, and the pin member 20 supported by the pedal bracket 3 is fitted into the two pairs of U-shaped cutouts 705, 705, 803, 803. In particular, the respective openings of the U-shaped cutout 705 and the U-shaped cutout 803 are oriented in different directions. Specifically, the opening of the cutout 705 in the swingable lever 7 is oriented in an obliquely upward direction, and the opening of the cutout 803 in the drop-out restriction member 8 is oriented in a horizontal direction.

The obliquely upwardly oriented opening of the cutout 705 in the swingable lever 7 means that the pawl 705*b* defining a lower edge of the cutout 705, i.e., the lower one of the pair of upper and lower pawls 705*a*, 705*b* protrudingly formed in the swingable lever 7, has a distal end located in front of the pin member 20. Thus, each of the lower pawls 705*b*, 705*b* of the swingable lever 7 located in front of the pin member 20 has a function of restricting the pin member 20 from being displaced frontwardly along the elongate holes 307, 307 in the normal condition. In this manner, the frontward displacement of the pin member 20 can be restricted to reliably prevent the pin member 20 from escaping outside from the cutouts 803, 803 of the drop-out restriction members 8, 8 to cause undesirable release of the engagement therebetween. That is, each of the lower pawls 705*b*, 705*b* of the swingable lever 7 functions as a displacement restriction portion which restricts the pin member 20 from being displaced in a direction causing release of the engagement between the pin member 20 and each of the drop-out restriction members 8, 8.

Each of the drop-out restriction members 8, 8 is formed with an insertion hole 804 having a relatively small diameter, in the rear end thereof and above the recess 802. The drop-out restriction member 8 is coupled to the swingable lever 7 through a coupling member 24 inserted through the insertion hole 804 (see FIGS. 2 and 5). In FIG. 4, the reference numeral 707 indicates an insertion hole formed in the swingable lever 7 to insertingly receive the coupling member 24. For example, the coupling member 24 comprises a crimping pin made of aluminum. The coupling pin 24 is designed to be broken in response to a large shearing force applied thereto, so as to release the coupling between the drop-out restriction member 8 and the swingable lever 7.

In the above manner, the drop-out restriction members 8, 8 are integrated with the swingable lever 7 through the coupling members 24, 24. Thus, when the brake pedal 4, the swingable lever 7 and the drop-out restriction members 8, 8 are assembled to the pedal bracket 3, each of the drop-out restriction members 8, 8 is engaged by three portions consisting of the pin member 20, the protruding end 704*a* of the swingable lever 7 and the coupling member 24, so as to restrict a relative movement or displacement between any two of the petal bracket 3, the brake pedal 4, the swingable lever 7 and the drop-out restriction members 8, 8. This integral subassembly formed of the components 3, 4, 7, 8, 8 provides an advantage of being able to assemble these components to the vehicle body with enhanced efficiency.

In the support structure according to this embodiment, in the normal condition, the brake pedal 4 is swingably supported by the pedal bracket 3 through the first support shaft S1 in a conventional manner. Thus, a driver can depress the pedal pad 4*a* at the lower end of the brake pedal 4 by his/her foot to give a braking force to the vehicle. During this operation, the first support shaft S1 is supported by not only the first support holes 303, 303 of the pedal bracket 3 but also the drop-out restriction members 8, 8 engaged by the pin member 20 and others. This makes it possible to sufficiently ensure the stiffness for supporting the first support shaft S1 during the pedal depressing operation, and reliably restrict drop-out of the first support shaft S1.

Specifically, the first support shaft S1 is supported by the protrusion 305 disposed below each of first support holes 303, 303 of the pedal bracket 3, and the drop-out restriction members 8, 8 each engaged by the pin member 20 and coupled to the swingable lever 7 in a relatively unswingable manner, so as to be restricted from dropping out of the first support holes 303, 303 downwardly. Thus, the supporting stiffness for the first support shaft S1 can be sufficiently ensured. Further, even if a large downward load is applied to the brake pedal 4, for example, due to an excessive pedal depressing operation by a driver, accidental drop-out of the brake pedal 4 can be reliably restricted.

When the dash panel 1 (see FIG. 1) and the pedal bracket 3 are displaced rearwardly during a vehicle frontal collision, the rear end of the swingable lever 7 comes into interference with the vertical wall 6*a* of the vehicle body member 6, and thereby the swingable lever 7 is swingably moved about the second support shaft S2 in a direction for flipping up the rear end of the swingable lever 7. FIG. 6 shows a process of this swing movement, wherein the solid lines indicate the swingable lever 7 after the swing movement, and the broken lines indicate the swingable lever 7 in a normal position (in the normal condition).

When the swingable lever 7 is swingingly moved in the above manner, the front end of the swingable lever 7 is displaced downwardly and frontwardly. Along with the displacement of the front end of the swingable lever 7, the pawls 705*a*, 705*a*, 705*b*, 705*b* protrudingly formed at the front end of the swingable lever 7 are displaced frontwardly, and the upper pawls 705*a*, 705*a* push the pin member 20 frontwardly along the elongate holes 307, 307. Thus, the pin member 20 is slidingly moved frontwardly and disengaged from the U-shaped cutouts 705, 705 to thereby release the engagement between the swingable lever 7 and the pin member 20, and allow the swingable lever 7 to be swingably moved in a direction for further displacing the front end thereof downwardly. Then, when the swingable lever 7 is further swingably moved, the first support shaft S1 serving as a swing supporting point of the brake pedal 4 is pushed downwardly by the arc-shaped portions 706, 706 of the swingable lever 7, and the protrusions 305, 305 located below the first support holes 303, 303 are crushed by the pushed first support shaft S1, so as to expand the cutouts 304, 304 to allow the first support shaft S1 to drop out of the pedal bracket 3 through the expanded cutouts 304, 304.

Each of the drop-out restriction members 8, 8 is designed to remove the drop-out restriction on the first support shaft S1 in conjunction with the above swing movement of the swingable lever 7. Specifically, the coupling members 24, 24 coupling the drop-out restriction members 8, 8 to the swingable lever 7 are broken by a shearing force arising from the swing movement of the swingable lever 7, so as to release the coupling between the swingable lever 7 and each of the drop-out restriction members 8, 8. Further, due to a displacement of the upper pawls 505*a*, 505*a* of the swingable lever 7, the pin member 20 is slidingly moved frontwardly along the elongate holes 307, 307, and disengaged from the U-shaped cutouts 803, 803 of the drop-out restriction members 8, 8, so as to release the engagement between the pin member 20 and each of the drop-out restriction members 8, 8.

In the above manner, through the breakage of the coupling members 24, 24 and the frontward slide movement of the pin member 20, the drop-out restriction members 8, 8 are released from the coupling and engagement with the pedal bracket 3 and the swingable lever 7 to remove the drop-out restriction on the first support shaft S1. Thus, the first support shaft S1 and the brake pedal 4 can drop down together with the drop-out restriction members 8, 8.

As described above, the support structure according to this embodiment is designed to swingingly move the swingable lever 7 during a vehicle frontal collision so as to allow the brake pedal 4 to forcibly drop out of the pedal bracket 3 downwardly. This makes it possible to reliably prevent the brake pedal 4 from being displaced rearwardly to input a large load to a leg of a driver. In the normal (non-collision) condition, the drop-out restriction members 8, 8 can restrict the brake pedal 4 from dropping out of the pedal bracket 3 to effectively enhance the supporting stiffness for the brake pedal 4. Further, the brake pedal 4, the swingable lever 7 and the drop-out restriction members 8, 8 can be assembled to the pedal bracket 3 to form an integral subassembly. This provides an advantage of being able to assemble these components to the vehicle body with enhanced efficiency.

The support structure according to this embodiment is designed to couple the drop-out restriction members 8, 8 to the swingable lever 7 through the coupling members 24, 24 which are breakable according to the swing movement of the swingable lever 7 during a vehicle frontal collision. This provides an advantage of being able to reliably restrict the drop-out of the first support shaft S1 in the normal condition by the drop-out restriction members 8, 8 coupled to the swingable lever 7, and release the coupling between the swingable lever 7 and each of the drop-out restriction members 8, 8 during the vehicle frontal collision so as to enable the drop-out of the first support shaft S1 to reliably prevent a rearward displacement of the brake pedal.

The support structure according to this embodiment is designed to displace the pin member 20 in engagement with the front ends of the drop-out restriction members 8, 8, frontwardly according to the swing movement of the swingable lever 7 during a vehicle collision, so as to release the engagement between the pin member 20 and each of the drop-out restriction members 8, 8. This provides an advantage of being able to reliably restrict the drop-out of the first support shaft S1 in the normal condition by the drop-out restriction members 8, 8 engaged by the pin member 20, and release the engagement between the pin member 20 and each of the drop-out restriction members 8, 8 during the vehicle collision so as to enable the drop-out of the first support shaft S1 to reliably prevent a rearward displacement of the brake pedal.

Particularly, the support structure according to this embodiment is designed such that the U-shaped cutout 803 is formed in each of the front ends of the drop-out restriction members 8, 8, and the pin member 20 is disengageably fitted into the U-shaped cutouts 803, 803. This provides an advantage of being able to bring the drop-out restriction members 8, 8 into engagement with the pin member 20 in a simplified structure, and disengage the pin member 20 from the cutouts 803, 803 during a vehicle collision so as to readily release the engagement between the pin member 8 and each of the drop-out restriction members 8, 8.

In the support structure according to this embodiment, the two pairs of upper and lower pawls 705a, 705a, 705b, 705b are protrudingly formed at the front end of the swingable lever 7, and each of the lower pawls 705b, 505b functions as a displacement restriction potion which restricts the pin member 20 from being displaced frontwardly along the elongate holes 307, 307 in the normal condition. This provides an advantage of being able to reliably prevent the supporting stiffness for the first support shaft S1 from being lowered in the normal condition due to release of the engagement between the pin member 8 and each of the drop-out restriction members 8, 8.

The support structure according to this embodiment is designed such that the protrusion 305 is formed below each of the first support holes 303, 303 of the pedal bracket 3 having the first support shaft S1 inserted therethrough, to function as a drop-out restriction portion which restricts the first support shaft S1 serving as a swing supporting point of the brake pedal 4 from dropping out of the first support holes 303, 303 downwardly. This provides an advantage of being able to enhance the supporting stiffness for the first support shaft S1 in the normal condition so as to reliably prevent accidental drop-out of the brake pedal 4.

The support structure according to this embodiment is designed such that the cutouts 304, 304 continuous with the respective first support holes 303, 303 are formed to allow the first support shaft S1 pushed downwardly by the swingable lever 7 during a vehicle collision to drop out of the first support holes 303, 303 therethrough. This provides an advantage of being able to allow the first support shaft S1 to reliably drop down during a vehicle collision so as to reliably prevent a rearward displacement of the brake pedal 4 to effectively protect a leg of a driver, in a simplified structure.

It is understood that the present invention is not limited to the specific structure exemplified by the above embodiment, but various modifications and changes in design may be made in the specific structure without departing from the spirit and scope of the present invention.

Figure 7:
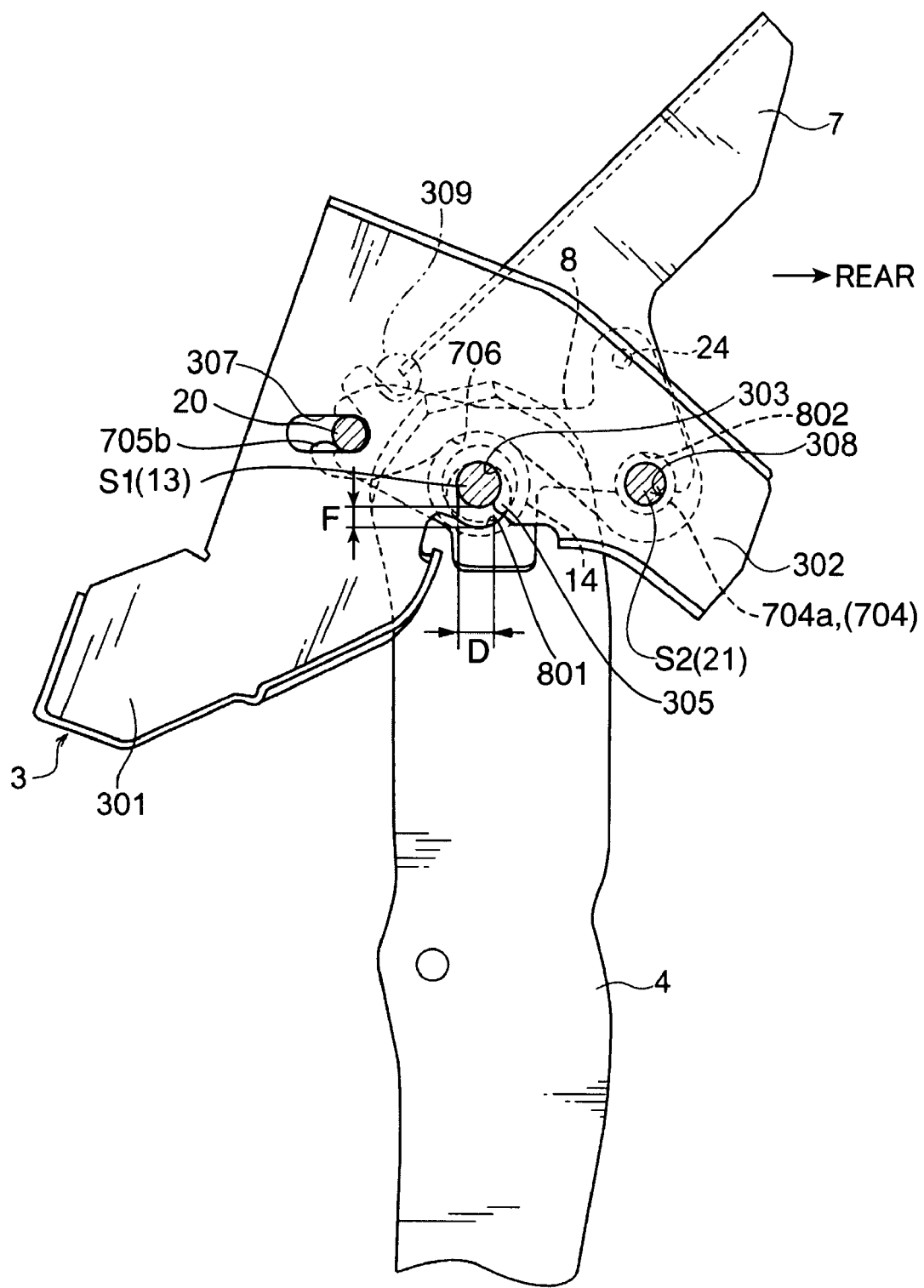
FIG. 7 is a side view showing a vehicle control pedal support structure according to another embodiment of the present invention.

For example, while the support structure according to the above embodiment is designed such that a predetermined clearance C is provided between the outer sleeve 14 at the upper end of the brake pedal 4 and the arc-shaped portion 706 of the swingable lever 7, and the first support shaft S1 for the brake pedal 4 is inserted through the insertion hole 801 of the drop-out restriction member 8 without a clearance, the present invention is not limited to this structure. Specifically, as shown in FIG. 7, the insertion hole 801 of the drop-out restriction member 8 may be increased in diameter or formed in an oval shape while minimizing a clearance between the outer sleeve 14 at the upper end of the brake pedal 4 and the arc-shaped portion 706 of the swingable lever 7, to define a predetermined clearance F between the first support shaft S1 for the brake pedal 4 and the lower edge of the insertion hole 801.

Figure 2:
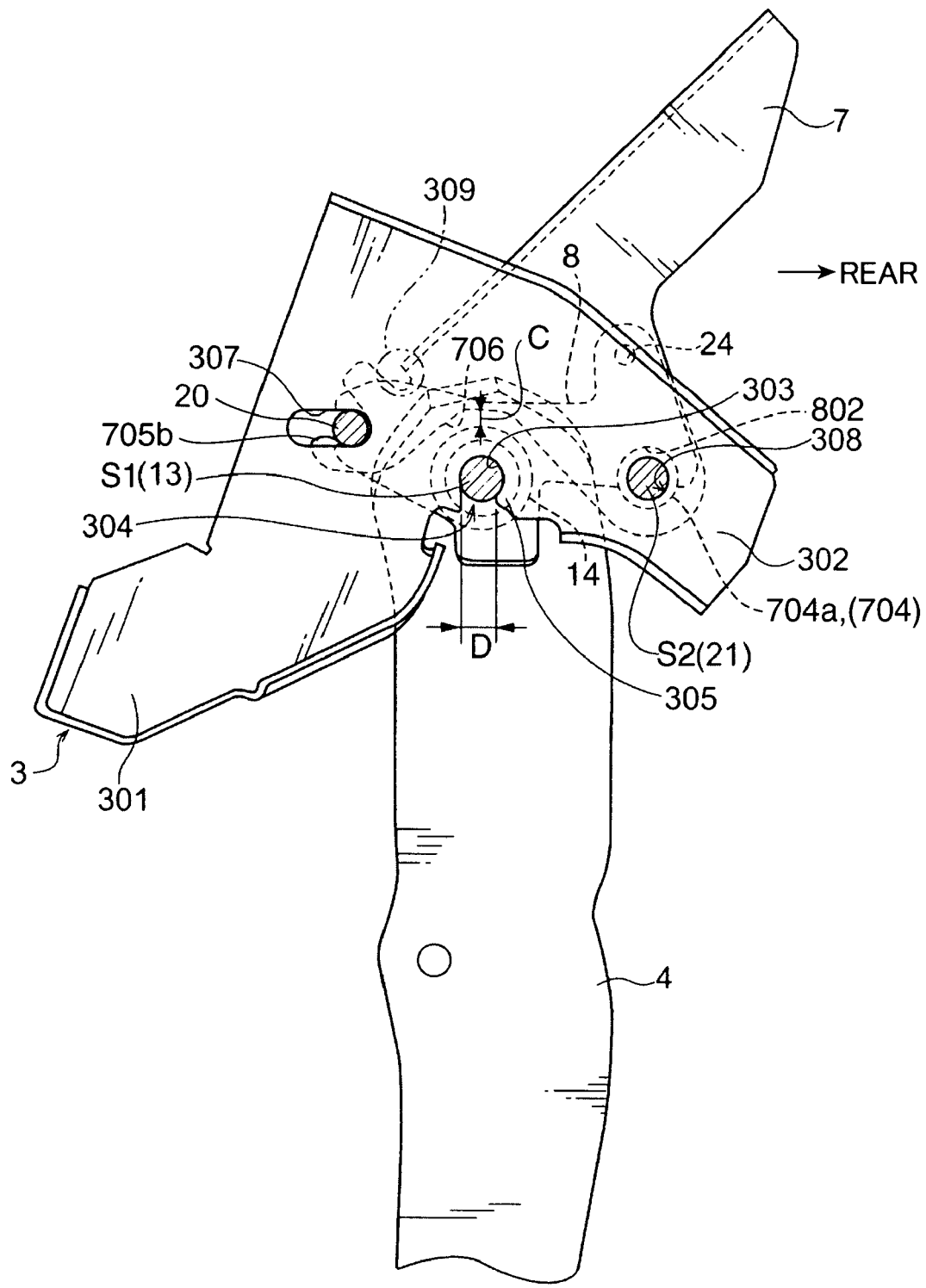
FIG. 2 is a side view specifically showing the support structure in a normal condition.

With this structure, the first support shaft S1 is allowed to move in a downward direction by the amount corresponding to the clearance F in the time of frontal collision of the vehicle. Accordingly, it is made easily possible to allow the swingable lever 7 to swing in the initial collision stage by an amount necessary to disengage the drop-out restriction member 8 from the pin member 20 even in the case where there does not exist a clearance C as shown in FIG. 2. In fact, in the case of the above structure where the clearance F (as shown in FIG. 7) is provided but not the clearance C (as shown in FIG. 2), there is a possibility that the first support shaft S1 moves downward by an amount corresponding to the clearance F when the greater force is applied onto the brake pedal 4 in the normal braking operation; however, the further movement of the first support shaft S1 in downward direction is prevented by the drop out restriction member 8 at a time when the first support shaft S1 rides on the lower peripheral edge of the insertion hole 801, and thus the brake pedal 4 in the depressable state can be securely maintained. Furthermore, with the provision of the clearance F and the minimized clearance C (as small as possible) between the swingable lever 7 and the brake pedal 4, the first support shaft S1 is pushed downward immediately after the swingable lever 7 commences the pivotal movement (swing motion) at the time of vehicle collision, and thus the brake pedal 4 can be disengaged from the pedal bracket 3, thereby securely preventing the rearward movement of the brake pedal 4 so as to protect the driver's leg from being injured with the brake pedal 4.

In the above embodiment, the pair of upper and lower pawls 705a, 705b are formed at the front end of the swingable lever 7, and the pin member 20 is fitted into the U-shaped cutout 705 defined therebetween. Alternatively, the lower pawl 705 b may be eliminated from the pair of upper and lower pawls 705a, 705b, to leave only the upper pawls 705a. In this case, it is desirable to take measures to restrict the pin member 20 from being displaced frontwardly in the normal condition, for example, to form a protrusion at a laterally central position of an edge of the elongate hole 307.

In the above embodiment, the recess 802 formed in the rear end of the drop-out restriction member 8 is engaged by the protruding end 704a of the cylindrical-shaped spacer 704 mounted in the swingable lever 7. Alternatively, any other suitable structure capable of restricting a downward displacement of the rear end of the drop-out restriction member 8 may be employed. For example, the rear end of the drop-out restriction member 8 may be engaged by the second support shaft S2 or the pedal bracket 3. Further, in the support structure according to the above embodiment designed to couple the rear end of the drop-out restriction member 8 to the swingable lever 7 through the coupling member 24 so as to restrict the downward displacement of the rear end of the drop-out restriction member 8, if the coupling member 24 has a certain level of strength, the above structure (i.e., the recess 802 of the drop-out restriction member 8 is engaged by the swingable lever 7 etc.) may be omitted.

In the above embodiment, the cutout 304 is formed below the first support hole 303 having the first support shaft S1 inserted therethrough, to allow the first support shaft S1 to drop out of the pedal bracket 3 therethrough during a vehicle collision. Alternatively, each of the side plates 302, 302 of the pedal bracket 3 may be enlarged downwardly, and an elongate hole extending in the longitudinal direction may be formed in a region of the enlarged portion located below the first support hole 303, to guide therealong the first support shaft S1 after dropping out of the first support hole 303.

While the above embodiment has been described based on one example where the support structure of the present invention is applied to the brake pedal 4, the present invention is not limited to a support structure for a brake pedal, but may be applied to any other type of vehicle control pedal, such as an accelerator pedal or a clutch pedal.

As described based on the specific embodiments, the present invention provides a support structure for a vehicle control pedal adapted to be swingingly operated by a driver, which comprises: a pedal bracket fixed to a dash panel, and formed with a support hole which has a first support shaft inserted therethrough to extend in a lateral direction of a vehicle body so as to serve as a swing supporting point of the control pedal, and an elongate hole which extends in a longitudinal direction of the vehicle body and has a pin member inserted therethrough to extend in the lateral direction; a swingable lever pivotally supported by the pedal bracket through a second support shaft extending in the lateral direction, and adapted to, during a vehicle collision, come into interference with a vehicle body member so as to be swingingly moved about the second support shaft while pushing the first support shaft downwardly to allow the first support shaft to drop out of the support hole; and a drop-out restriction member engaged by the pin member and coupled to the swingable lever in a relatively unswingable manner, so as to restrict the drop-out of the first support shaft. The support structure is designed such that, according to the swing movement of the swingable lever during the vehicle collision, the restriction on drop-out of the first support shaft by the drop-out restriction member is removed to allow the first support shaft to drop out of the support hole.

In the above support structure of the present invention, in a normal (i.e., non-collision) condition, the first support shaft serving as a swing supporting point of the control pedal is supportedly inserted through the support hole of the pedal bracket, and restricted from dropping out of the support hole by the drop-out restriction member which is engaged by the laterally-extending pin member and coupled to the swingable member in a relatively unswingable manner. This makes it possible to sufficiently ensure the supporting stiffness for the first support shaft so as to reliably restrict accidental drop-out of the control pedal. Further, during a vehicle collision, the swingable lever is swingingly rotated to allow the first support shaft to forcibly drop out of the pedal bracket. This makes it possible to reliably prevent the control pedal from being displaced rearwardly to input a large load to a leg of a driver.

Preferably, in the support structure of the present invention, the swingable lever and the drop-out restriction member are coupled to each other in a relatively unswingable manner through a coupling member. The coupling member is adapted to be broken according to the swing movement of the swingable lever during the vehicle collision, so as to release the coupling between the swingable lever and the drop-out restriction member to enable the drop-out of the first support shaft.

This support structure has an advantage of being able to reliably restrict the drop-out of the first support shaft in the normal condition by the drop-out restriction member coupled to the swingable lever, and release the coupling between the swingable lever and the drop-out restriction member during the vehicle collision so as to enable the drop-out of the first support shaft to reliably prevent a rearward displacement of the control pedal.

Preferably, in the support structure of the present invention, the swingable lever is adapted to pushingly move the pin member in a predetermined direction according to the swing movement thereof during the vehicle collision, so as to release the engagement between the pin member and the drop-out restriction member to enable the drop-out of the first support shaft.

In this support structure, the pin member in engagement with the drop-out restriction member can be pushingly moved during the vehicle collision by the swingable member. This provides an advantage of being able to reliably release the engagement between the pin member and the drop-out restriction member so as to enable the drop-out of the first support shaft to reliably prevent a rearward displacement of the control pedal.

Preferably, in the above support structure, the drop-out restriction member is formed with a U-shaped cutout adapted to allow the pin member to be disengageably fitted thereinto. The pin member is fitted into the U-shaped cutout to achieve the engagement between the pin member and the drop-out restriction member.

The support structure designed to allow the pin member to be disengageably fitted into the U-shaped cutout formed in the drop-out restriction member has an advantage of being able to bring the drop-out restriction member into engagement with the pin member in a simplified structure, and disengage the pin member from the cutout during a vehicle collision so as to readily release the engagement between the pin member and the drop-out restriction member.

Preferably, the swingable lever has a displacement restriction portion which restricts the pin member from being displaced in a direction causing release of the engagement between the pin member and the drop-out restriction member, in a normal condition.

This provides an advantage of being able to reliably prevent the supporting stiffness for the first support shaft from being lowered in the normal condition due to release of the engagement between the pin member and the drop-out restriction member.

Preferably, the pedal bracket has a drop-out restriction portion which restricts the first support shaft from dropping out of the support hole, in a normal condition.

This provides an advantage of being able to enhance the supporting stiffness for the first support shaft in the normal condition so as to reliably prevent accidental drop-out of the control pedal.

Preferably, in the support structure of the present invention, the pedal bracket is formed with a cutout continuous with the support hole in such a manner as to allow the first support shaft pushed downwardly by the swingable lever during the vehicle collision, to drop out of the support hole through the cutout.

This provides an advantage of being able to allow the first support shaft to reliably drop down during the vehicle collision so as to reliably prevent a rearward displacement of the brake pedal, in a simplified structure.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on two (2) Japanese Patent Application Serial Nos. 2006-188199 and 2006-256860, filed with Japan Patent Office on Jul. 7, 2006 and Sep. 22, 2006, respectively, the contents of which are hereby incorporated by reference.

What is claimed is:

1. A support structure for a vehicle control pedal adapted to be swingingly operated by a driver, comprising:
   a pedal bracket fixed to a dash panel, and formed with a support hole which has a first support shaft inserted therethrough to extend in a lateral direction of a vehicle body so as to serve as a swing supporting point of said control pedal, and an elongate hole which extends in a longitudinal direction of the vehicle body and has a pin member inserted therethrough to extend in the lateral direction;
   a swingable lever pivotally supported by said pedal bracket through a second support shaft extending in the lateral direction, and adapted to, during a vehicle collision, come into interference with a vehicle body member so as to be swingingly moved about said second support shaft while pushing said first support shaft downwardly to allow said first support shaft to drop out of said support hole; and a drop-out restriction member engaged by said pin member and coupled to said swingable lever in a relatively unswingable manner, so as to restrict the drop-out of said first support shaft, wherein said support structure is designed such that, according to the swing movement of said swingable lever during the vehicle collision, the restriction on drop-out of said first support shaft by said drop-out restriction member is removed to allow said first support shaft to drop out of said support hole.

2. The support structure according to claim 1, wherein said swingable lever and said drop-out restriction member are coupled to each other in a relatively unswingable manner through a coupling member, said coupling member being adapted to be broken according to the swing movement of said swingable lever during the vehicle collision, so as to release the coupling between said swingable lever and said drop-out restriction member to enable the drop-out of said first support shaft.

3. The support structure according to claim 1, wherein said swingable lever is adapted to pushingly move said pin member in a predetermined direction according to the swing movement thereof during the vehicle collision, so as to release the engagement between said pin member and said drop-out restriction member to enable the drop-out of said first support shaft.

4. The support structure according to claim 3, wherein said drop-out restriction member is formed with a U-shaped cutout adapted to allow said pin member to be disengageably fitted thereinto, wherein said pin member is fitted into said U-shaped cutout to achieve said engagement between said pin member and said drop-out restriction member.

5. The support structure according to claim 3, wherein said swingable lever has a displacement restriction portion which restricts said pin member from being displaced in a direction causing release of said engagement between said pin member and said drop-out restriction member, in a normal condition.

6. The support structure according to claim 1, wherein said pedal bracket has a drop-out restriction portion which restricts said first support shaft from dropping out of said support hole, in a normal condition.

7. The support structure according to claim 1, wherein said pedal bracket is formed with a cutout continuous with said support hole in such a manner as to allow said first support shaft pushed downwardly by said swingable lever during the vehicle collision, to drop out of said support hole through said cutout.

8. A support structure for a vehicle control pedal adapted to be swingingly operated by a driver, comprising:
a pedal bracket fixed to a dash panel, and formed with a support hole which has a first support shaft inserted therethrough to extend in a lateral direction of a vehicle body so as to serve as a swing supporting point of said control pedal, and an elongate hole which extends in a longitudinal direction of the vehicle body and has a pin member inserted therethrough to extend in the lateral direction;

a swingable lever pivotally supported by said pedal bracket through a second support shaft extending in the lateral direction, and adapted to, during a vehicle collision, come into interference with a vehicle body member so as to be swingingly moved about said second support shaft while pushing said first support shaft downwardly to allow said first support shaft to drop out of said support hole; and a drop-out restriction member engaged by said pin member and coupled to said swingable lever in a relatively unswingable manner through a coupling member, so as to restrict the drop-out of said first support shaft, wherein said support structure is designed such that, according to the swing movement of said swingable lever during the vehicle collision, said coupling member is broken to release the coupling between said swingable lever and said drop-out restriction member, and said pin member is pushingly moved in a predetermined direction to release the engagement between said pin member and said drop-out restriction member, so that the restriction on drop-out of said first support shaft by said drop-out restriction member is removed to allow said first support shaft to drop out of said support hole.

9. A support structure for a vehicle control pedal adapted to be swingingly operated by a driver, comprising:
a pedal bracket fixed to a dash panel, and formed with a support hole which has a first support shaft inserted therethrough to extend in a lateral direction of a vehicle body so as to serve as a swing supporting point of said control pedal, and an elongate hole which extends in a longitudinal direction of the vehicle body and has a pin member inserted therethrough to extend in the lateral direction;

a swingable lever pivotally supported by said pedal bracket through a second support shaft extending in the lateral direction, and adapted to, during a vehicle collision, come into interference with a vehicle body member so as to be swingingly moved about said second support shaft while pushing said first support shaft downwardly to allow said first support shaft to drop out of said support hole; and a drop-out restriction member engaged by said pin member and coupled to said swingable lever in a relatively unswingable manner through a coupling member, so as to restrict the drop-out of said first support shaft, said drop-out restriction member is formed with a U-shaped cutout adapted to allow said pin member to be disengageably fitted thereinto, wherein said pin member is fitted into said U-shaped cutout to achieve said engagement between said pin member and said drop-out restriction member, wherein said support structure is designed such that, according to the swing movement of said swingable lever during the vehicle collision, said coupling member is broken to release the coupling between said swingable lever and said drop-out restriction member, and said pin member is pushingly moved in a predetermined direction and disengaged from said U-shaped cutout of said drop-out restriction member, so that the restriction on drop-out of said first support shaft by said drop-out restriction member is removed to allow said first support shaft to drop out of said support hole.

* * * * *